(12) United States Patent
Lin

(10) Patent No.: US 7,898,816 B2
(45) Date of Patent: Mar. 1, 2011

(54) LATCHING MECHANISM FOR PORTABLE ELECTRONIC DEVICE

(75) Inventor: Tsung-Peng Lin, Tu-Cheng (TW)

(73) Assignee: Chi Mei Communication Systems, Inc., Tu-Cheng, Taipei Country (TW)

( * ) Notice: Subject to any disclaimer, the term of this patent is extended or adjusted under 35 U.S.C. 154(b) by 725 days.

(21) Appl. No.: 11/952,965

(22) Filed: Dec. 7, 2007

(65) Prior Publication Data
US 2009/0002955 A1    Jan. 1, 2009

(30) Foreign Application Priority Data
Jun. 29, 2007    (CN) .................. 2007 1 0076264

(51) Int. Cl.
*H05K 5/00* (2006.01)
(52) U.S. Cl. ........................... 361/755; 361/715
(58) Field of Classification Search ............... 361/715, 361/755; 16/342, 285, 307, 374
See application file for complete search history.

(56) References Cited

U.S. PATENT DOCUMENTS

| | | | |
|---|---|---|---|
| 5,630,332 A * | 5/1997 | Aldieri et al. | 70/379 R |
| 5,928,009 A * | 7/1999 | Lee | 439/131 |
| 6,033,130 A * | 3/2000 | Muroi et al. | 396/448 |
| 6,213,654 B1 * | 4/2001 | Kume et al. | 396/349 |
| 6,678,539 B1 * | 1/2004 | Lu | 455/575.1 |
| 7,085,375 B2 * | 8/2006 | Katoh | 379/433.13 |
| 7,653,968 B2 * | 2/2010 | Kubota | 16/330 |
| 7,716,788 B2 * | 5/2010 | Lin | 16/330 |

* cited by examiner

*Primary Examiner*—Hung S Bui
(74) *Attorney, Agent, or Firm*—Jeffrey T. Knapp

(57) ABSTRACT

A latching mechanism (10) for a portable electronic device (30) includes a main body (12), a latching member (16), a resilient member (14), and an operating member (18). The main body has a shaft (124). The latching member is mounted to the shaft and is slidable relative to the shaft along an extending direction of the shaft. One end of the resilient member abuts the shaft and an opposite end of the resilient member abuts the latching member. The operating member is mounted to shaft, and the operating member is rotatable relative to the shaft thereby driving the latching member to slide relative to the shaft.

18 Claims, 7 Drawing Sheets

LATCHING MECHANISM FOR PORTABLE ELECTRONIC DEVICE

BACKGROUND OF THE INVENTION

1. Field of the Invention

The present invention generally relates to latching mechanisms for portable electronic devices and, particularly, to a latching mechanism configured (i.e., structured and arranged) for mounting an accessory to a portable electronic device.

2. Discussion of the Related Art

With the development of recent technology of information processing, portable electronic devices such as digital cameras, MP3 players, video cameras, mobile phone, and personal digital assistants (PDAs) are widely used.

An accessory is usually mounted on a given portable electronic device for decoration and/or other purposes. However, the accessory is fixed to the portable electronic device and being unable to change according to a user's preference.

Therefore, a new latching mechanism for a portable electronic device is desired in order to overcome the above-described shortcoming.

SUMMARY

In one embodiment thereof, a latching mechanism for a portable electronic device includes a main body, a latching member, a resilient member, and an operating member. The main body has a shaft. The latching member is mounted to the shaft and is slidable relative to the shaft along an extending direction of the shaft. One end of the resilient member abuts the shaft and an opposite end of the resilient member abuts the latching member. The operating member is mounted to shaft, and the operating member is rotatable relative to the shaft thereby driving the latching member to slide relative to the shaft.

Other advantages and novel features of the embodiments will become more apparent from the following detailed description thereof when taken in conjunction with the accompanying drawings.

BRIEF DESCRIPTION OF THE DRAWINGS

Many aspects of the present latching mechanism can be better understood with reference to the following drawings. The components in the drawings are not necessarily to scale, the emphasis instead being placed upon clearly illustrating the principles of the present latching mechanism. Moreover, in the drawings, like reference numerals designate corresponding parts throughout the several views.

DETAILED DESCRIPTION OF THE EMBODIMENT

The present latching mechanism is suitable for portable electronic devices such as digital cameras, MP3 players, video cameras, mobile phones, PDAs, and the like. Other applications with similar latching mechanism employed can also be found.

Figure 5:
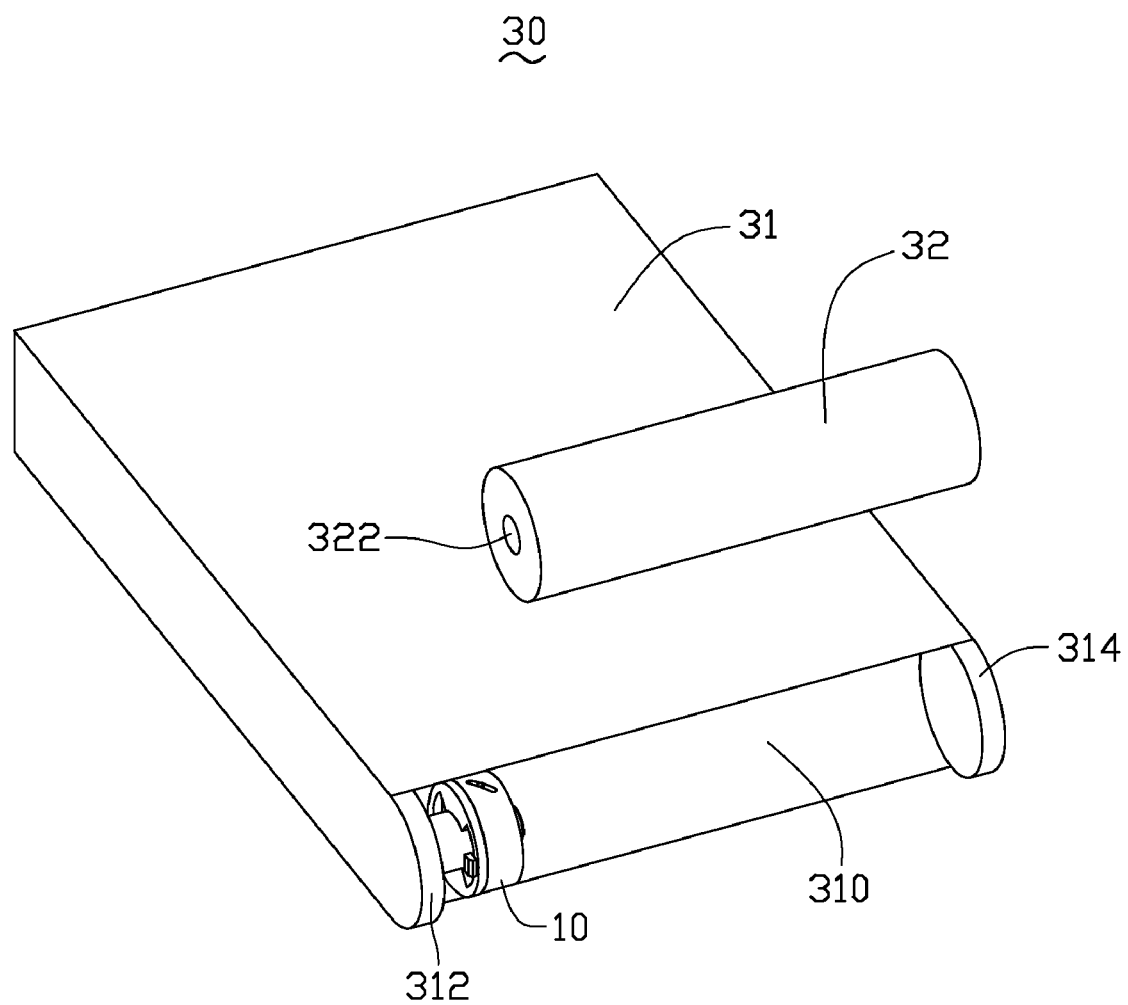
FIG. 5 is a partially exploded, isometric view of a portable electronic device with the latching mechanism shown in FIG. 1.
Figure 6:
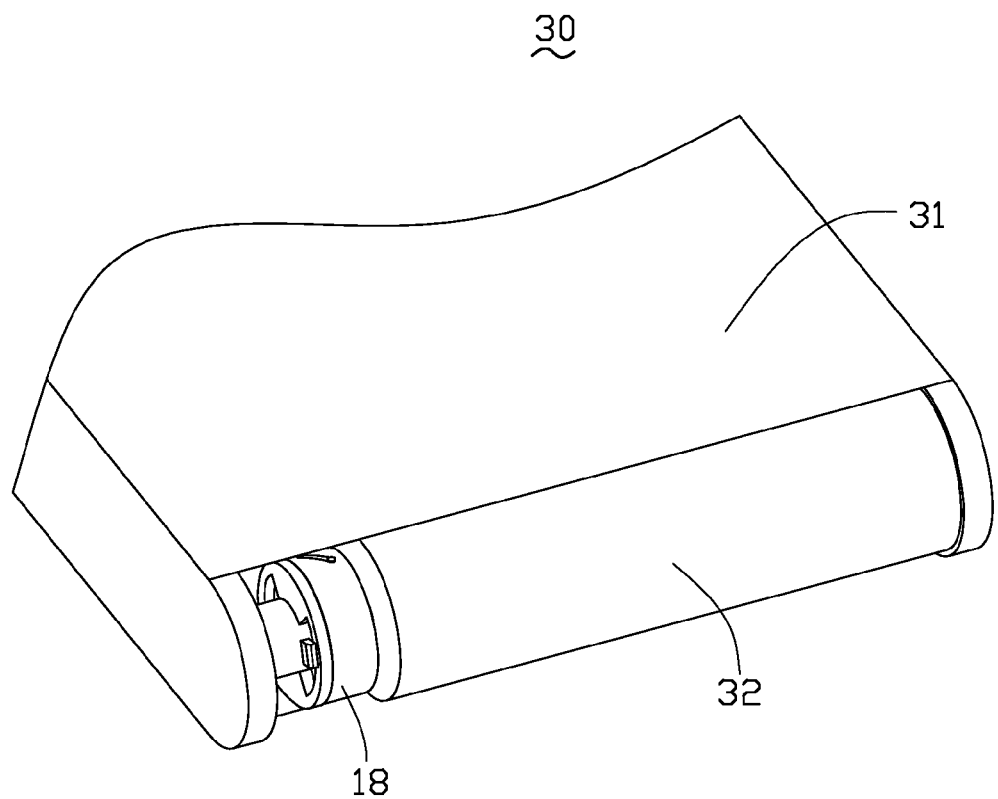
FIG. 6 is an assembled, isometric view of the portable electronic device shown in FIG. 5.

Referring to the drawings in detail, FIGS. 5-6 show a present latching mechanism 10 according to a first embodiment. The latching mechanism 10 is configured (i.e., structured and arranged) for mounting an accessory member 32 to a housing 31 of a portable electronic device 30. The housing 31 defines a receiving groove 310 at one end thereof and has two mounting portions 312, 314. The two mounting portions 312, 314 are provided at two ends of the receiving groove 310. The accessory member 32 defines a latching hole 322 in one end thereof. One end of the latching mechanism 10 is mounted to the mounting portion 312 and an opposite end of the latching mechanism 10 is mounted in the latching hole 322, thereby mounting the accessory member 32 in the receiving groove 310.

Figure 1:
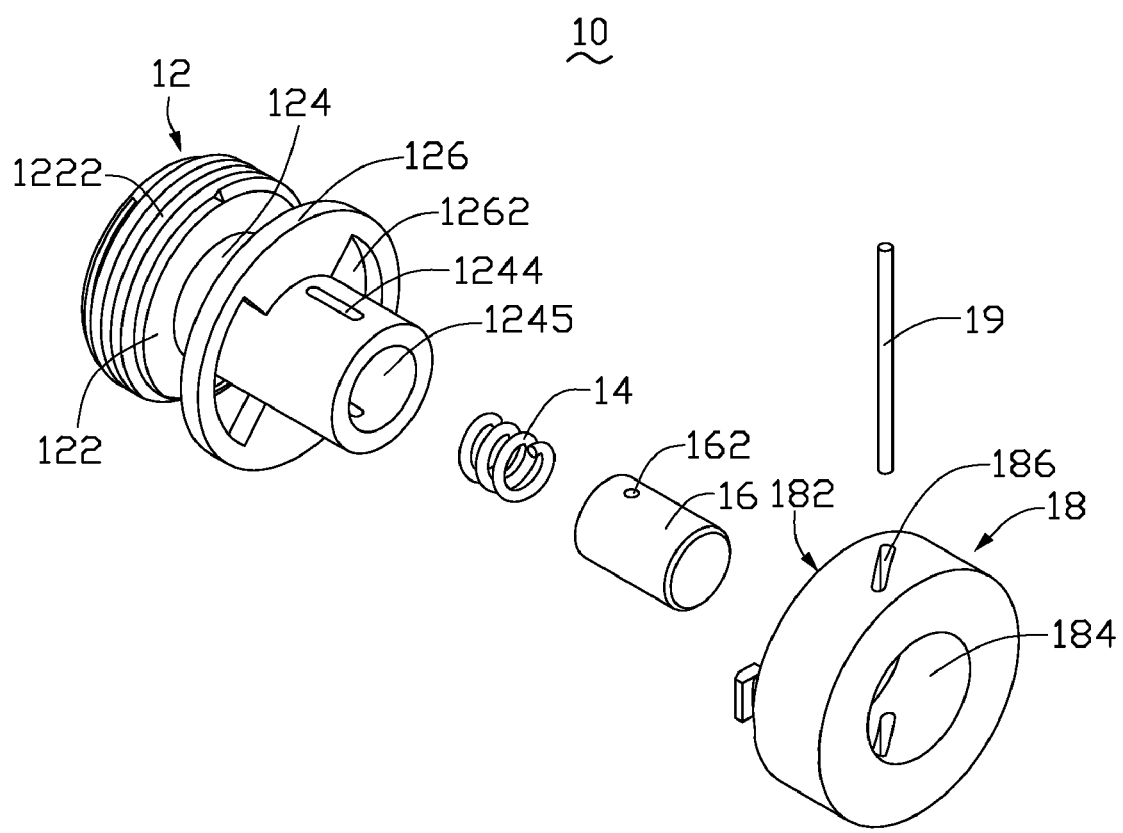
FIG. 1 is an exploded, isometric, side view of a present latching mechanism, in accordance with a first embodiment.
Figure 4:
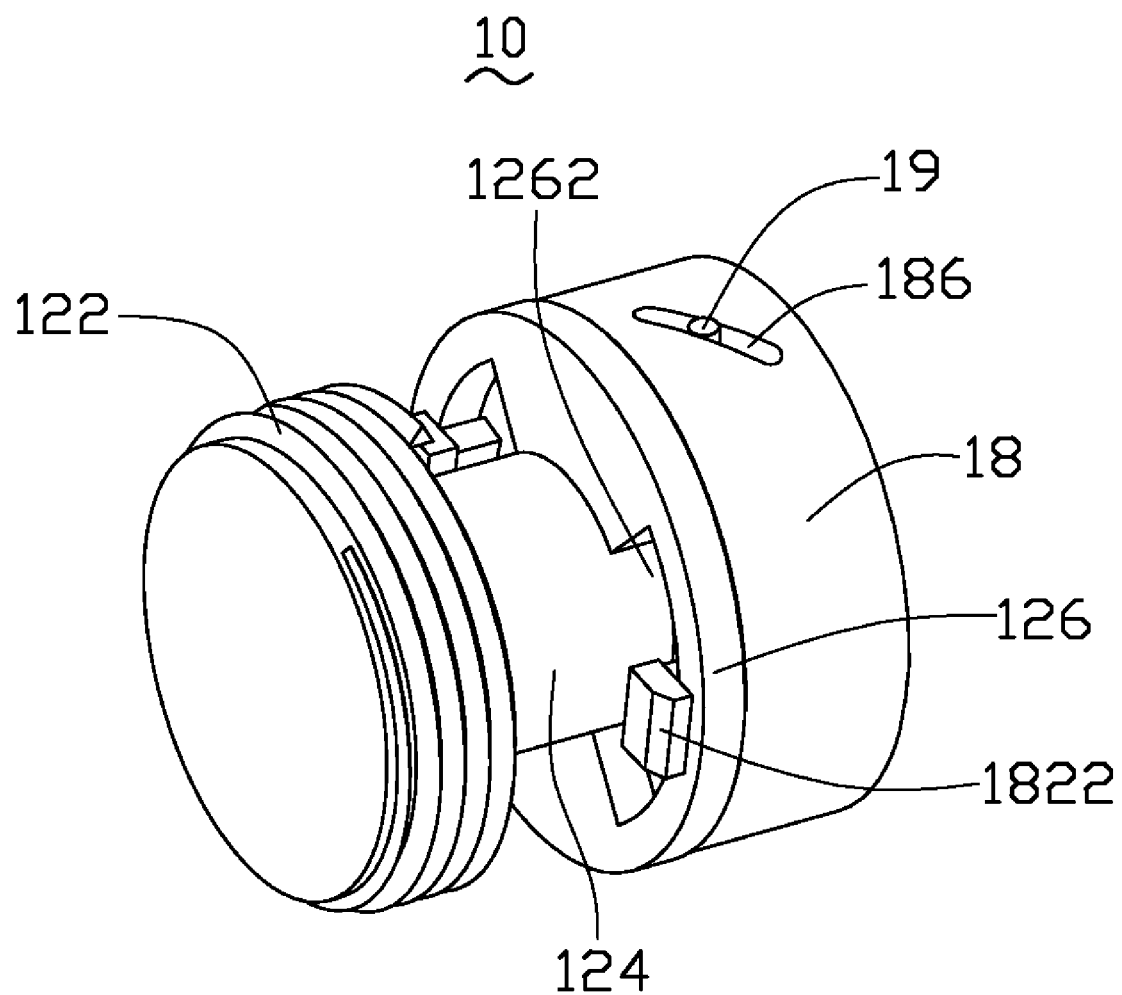
FIG. 4 is an assembled, isometric view of the latching mechanism shown in FIG. 1.

Also referring to FIG. 1 and FIG. 4, the latching mechanism 10 includes a main body 12, a resilient member 14, a latching member 16, an operating member 18, and a pin 19. The resilient member 14, the latching member 16, and the operating member 18 are mounted to the main body 12 by the pin 19.

Figure 2:
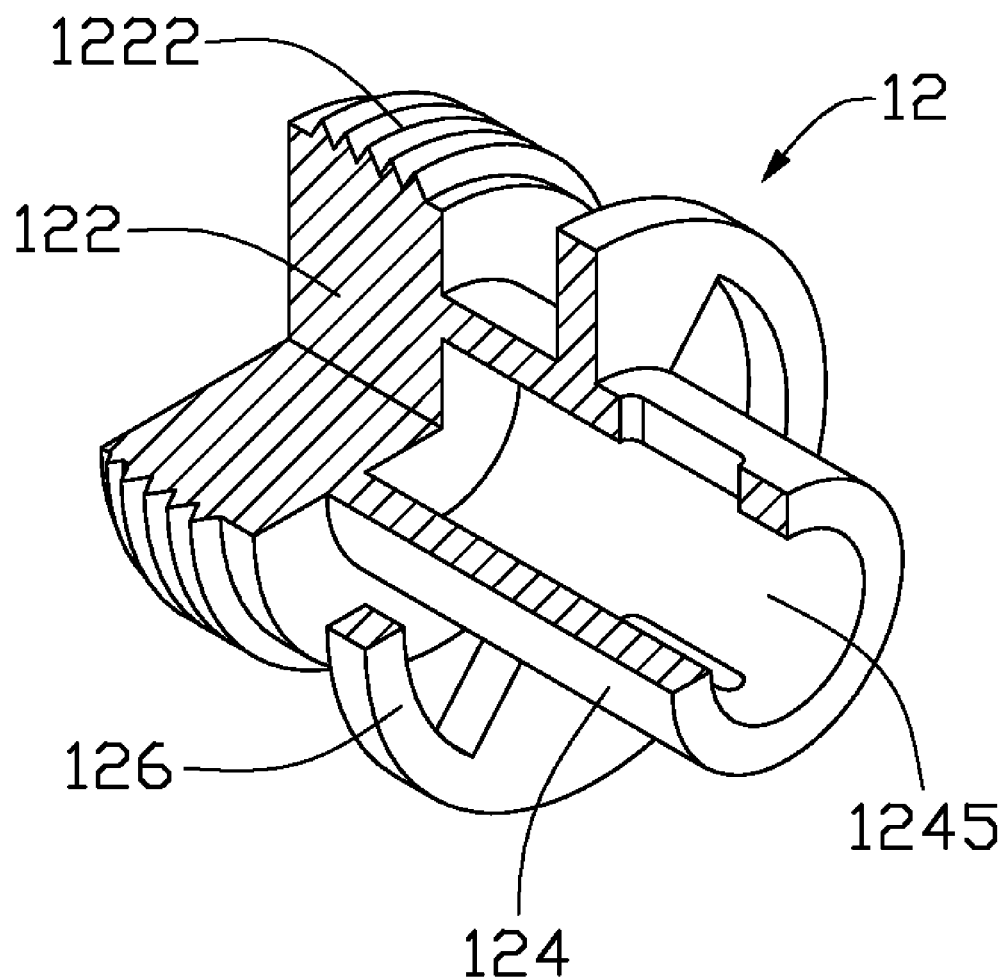
FIG. 2 is an enlarged, partially cut-away view of a main body of the latching mechanism shown in FIG. 1.

Also referring to FIG. 2, the main body 12 includes a mounting end 122, a shaft 124, and a flange 126. The mounting end 122 is a substantially cylinder in shape. An outer screw thread 1222 is formed on a peripheral wall of the mounting end 122. The screw thread 1222 is configured for engaging with an inner screw thread (not shown) of the mounting portion 312 of the housing, thereby mounting the main body 12 to the mounting portion 312 and consequently mounting the main body 12 of the latching mechanism 10 to the housing 31 of the portable electronic device 30.

The shaft 124 is a substantially hollow cylinder in shape and extends from one flat surface of the mounting end 122. The shaft 124 defines a cavity 1245 therein. The shaft 124 and the mounting end 122 are coaxially arranged. One end of the shaft 124 is connected to the mounting end 122. The cavity 1245 extends along an axial direction of the shaft 124. An outer diameter of the shaft 124 is smaller than a diameter of the mounting end 122. A peripheral wall of the shaft 124 defines at least one sliding groove 1244. In the present embodiment, there are two symmetrical sliding grooves 1244. Each sliding groove 1244 extends along the axial direction of the shaft 124.

The flange 126 is substantially ring-shaped. The flange 126 is mounted around the peripheral wall of the shaft 124 and between the mounting end 122 and the sliding grooves 1244. The flange 126 defines at least one mounting cutout 1262 therethrough. In the present embodiment, there are two symmetrical mounting cutouts 1262. Each mounting cutout 1262 is a sector in shape.

The resilient member 14 is spiral-shaped (i.e. a coiled spring) and preferably made of metal. A diameter of the resilient member 14 is slightly smaller than an inner diameter of the shaft 124 so that the resilient member 14 can be inserted into the cavity 1245 of the shaft 124.

The latching member 16 is a substantially cylinder in shape. A diameter of the latching member 16 is slightly smaller than the inner diameter of the shaft 124 so that the latching member 16 can be inserted into the cavity 1245 of the shaft 124. The diameter of the latching member 16 is slightly larger than the diameter of the resilient member 14 so that one end of the resilient member 14 can abut with one end of the latching member 16. The latching member 16 defines a pin hole 162 through one end thereof. The pin hole 162 extends along a radial direction of the latching member 16, thereby corresponding to the two sliding grooves 1244.

Figure 3:
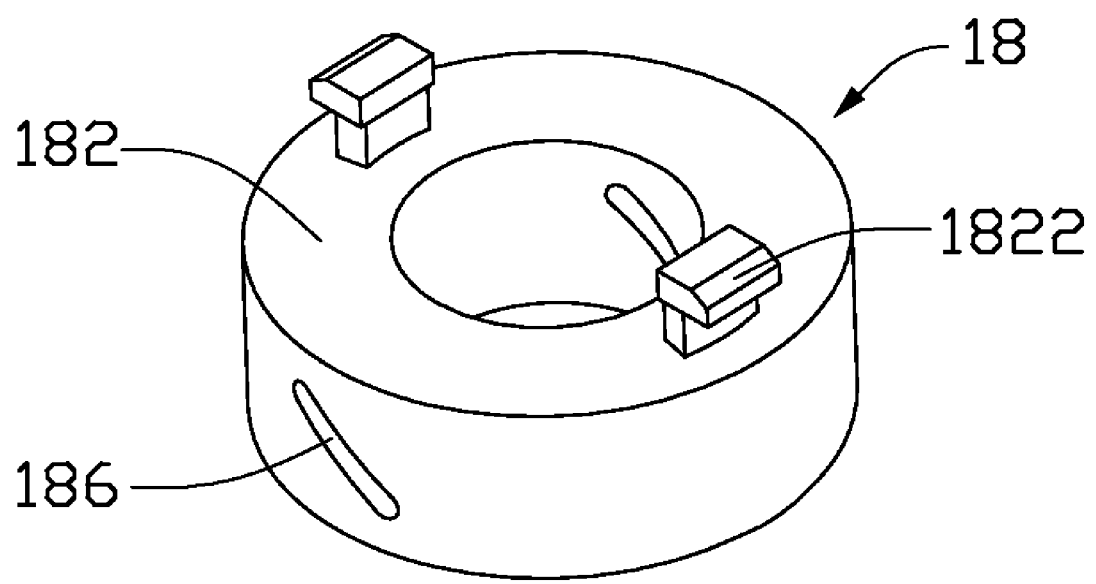
FIG. 3 is an enlarged, isometric view of an operating member of the latching mechanism shown in FIG. 1, viewed from another aspect.

Also referring to FIG. 3, the operating member 18 is a substantially hollow cylinder in shape and has a through hole 184 defined in a center thereof. An inner diameter of the operating member 18 is slightly larger than an outer diameter of the shaft 124 thereby allowing the shaft 124 to be inserted into the through hole 184. An outer diameter of the operating member 18 is smaller than an outer diameter of the flange 126, thereby allowing one end of the operating member 18 to abut with one end of the flange 126. A length of the operating member 18 along an axial direction thereof is smaller than a length of the latching member 16 along an axial direction thereof.

A peripheral wall of the operating member 18 defines at least one guiding groove 186 therein. In the present embodiment, there are two symmetrical guiding grooves 186. Each guiding groove 186 forms an angle relative to an axis of the operating member 18. The angle between the guiding groove 186 and the axis of the operating member 18 is larger than 0 degree and smaller than 90 degrees. The two guiding grooves 186 corresponds to the two sliding grooves 1244. At least one hook 1882 perpendicularly extends from the end of the operating member 18 adjacent to the flange 126. In the present embodiment, there are two symmetrical hooks 1882. One hook 1882 faces away from the other. Each hook 1882 is configured for engaging in a corresponding mounting cutout 1262 of the flange 126, thereby rotatably mounting the operating member 18 to the flange 126.

The pin 19 is a substantially long and thin pole in shape. The pin 19 is configured for being receivable in the guiding grooves 186 of the operating member 18, the sliding grooves 1244 of the shaft 124, and the pin hole 162 of the latching member 16, thereby slidable and rotatably mounting the latching member 16 to the shaft 124 and the operating member 18.

In assembly, the resilient member 14 and the latching member 16 are inserted into the cavity 1245 of the shaft 124. One end of the resilient member 14 abuts with the mounting end 122. An opposite end of the resilient member 14 abuts with one end of the latching member 16. An opposite end of the latching member 16 is exposed out of the cavity 1245. One end of the shaft 124 is inserted into the through hole 184 of the operating member 18. Each hook 1822 of the operating member 18 is inserted into a corresponding mounting cutout 1262 of the flange 126 thereby mounting the operating member 18 to the main body 12. The pin 19 is inserted through one guiding groove 186, one sliding groove 1244, the pin hole 162, the other sliding groove 1244, and the other guiding groove 186 in turn, thereby mounting the resilient member 14 and the latching member 16 to the main body 12. The resilient member 14 is slightly compressed. The sliding groove 1244 and the guiding groove 186 cooperate to form an angle therebetween. The angle between the sliding groove 1244 and the guiding groove 186 is larger than 0 degree and smaller than 90 degrees. The end of the latching member 16 exposes out of the through hole 184. Thus, the latching mechanism 10 is completely assembled, as represented in FIG. 4.

Also referring to FIGS. 5-6, when assembling the latching mechanism 10 to the housing 31 of the portable electronic device 30, the mounting end 122 is mounted to the mounting portion 312 by the engagement of the outer screw thread 1222 of the mounting end 122 and the inner screw thread of the mounting portion 312. Thus, the latching mechanism 10 is mounted to the housing 31.

When assembling the accessory member 32 to the housing 31, the operating member 18 is rotated. The latching member 16 is moved to slide towards the mounting portion 122 along the axial direction of the shaft 14 due to the engagement of the pin 19, the guiding grooves 186, the sliding grooves 1244, and the pin hole 162. The resilient member 14 is further compressed. The accessory member 32 is inserted into the receiving groove 310 of the housing 31. The end defining the latching hole 322 of the accessory member 32 is adjacent to the latching mechanism 10. The operating member 18 is released, and the latching member 16 is moved towards the accessory member 32 due to the decompression of the resilient member 14, until the end of the latching member 16 is received into the latching hole 322. Thus, the accessory member 32 is mounted to the housing 31, as represented in FIG. 6. The removal of the accessory member 32 from the housing 31 is substantially a traverse process of the above-described process.

Figure 7:
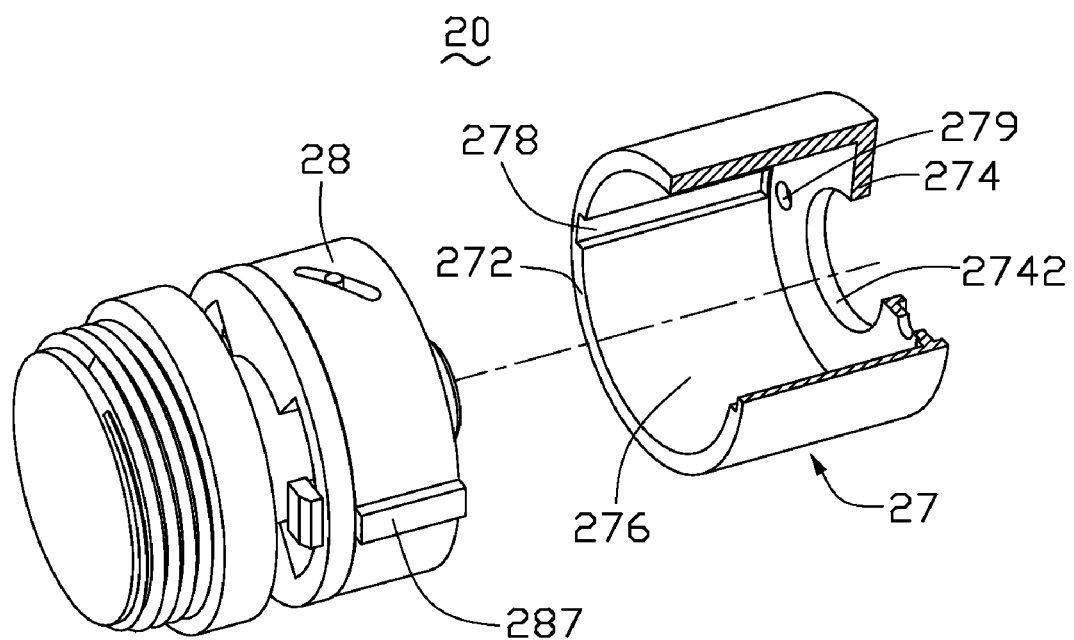
FIG. 7 is a partially exploded, isometric view of a present latching mechanism in accordance with a second embodiment.

Also referring to FIG. 7, a latching mechanism 20 of a second embodiment is similar to the latching mechanism 10 of the first embodiment except that the latching mechanism 20 further includes a sleeve 27. The sleeve 27 is a substantially hollow cylinder in shape and has a receiving cavity 276 defined therein. The sleeve 27 has an open end 272 and a half-closed end 274. The half-closed end 274 defines an aperture 2742 in a center thereof. Two grooves 278 are symmetrically defined in an inner wall of the sleeve 27. Each groove 278 extends along an axial direction of the sleeve 27. A peripheral wall of an operating member 28 forms with two symmetrical ridges 287. The operating member 28 is received in the receiving cavity 276 by the engagement of each ridge 287 and a corresponding groove 278. Thus, the sleeve 27 is rotatable with the operating member 28. Alternatively, the sleeve 27 may be mounted to the operating member 28 by the engagement of a bolt hole 279 defined in the half-closed end 274, a bolt hole (not shown) defined in one end of the operating member 28, and a bolt.

It should be understood that sliding groove 1244 may form an angle relative to the axis of the shaft 124. The angle between the sliding groove 1244 and the axis of the shaft 124 is larger than 0 degree and smaller than 90 degrees. The resilient member 14 may alternatively be made of another material (e.g. plastic or rubber). The resilient member 14 may alternatively have a different configuration, for example, a leaf spring or a resilient cylinder.

It should be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A latching mechanism for a portable electronic device, the latching mechanism comprising:
   a main body having a shaft;

a latching member mounted to the shaft and being slidable relative to the shaft along an extending direction of the shaft;

a resilient member, one end of the resilient member abutting the main body and an opposite end of the resilient member abutting the latching member; and an operating member being mounted to the shaft;

a pin connecting the operating member, the shaft and the latching member together, the operating member being rotatable relative to the shaft to allow the pin to drive the latching member to slide relative to the shaft.

2. The latching mechanism as claimed in claim 1, wherein the shaft defines a sliding groove therein, the latching member defines a pin hole therein, the operating member defines a guiding groove therein, and the pin is configured for being receivable in the sliding groove, the pin hole, and the guiding groove.

3. The latching mechanism as claimed in claim 2, wherein the sliding groove and the guiding groove cooperate to form an angle therebetween.

4. The latching mechanism as claimed in claim 3, wherein the angle between the sliding groove and the guiding groove is larger than 0 degree and smaller than 90 degrees.

5. The latching mechanism as claimed in claim 3, wherein the shaft is a substantially hollow cylinder in shape and has a cavity defined therein, and the cavity communicates with the sliding groove.

6. The latching mechanism as claimed in claim 5, wherein the sliding groove extends in an axial direction of the shaft.

7. The latching mechanism as claimed in claim 5, wherein the sliding groove forms an angle relative to an axis of the shaft, and the angle between the sliding groove and the axis of the shaft is larger than 0 degree and smaller than 90 degrees.

8. The latching mechanism as claimed in claim 5, wherein the operating member is a substantially hollow cylinder in shape and has a through hole defined therein, and the through hole communicates with the guiding groove.

9. The latching mechanism as claimed in claim 8, wherein the guiding groove forms an angle relative to an axis of the operating member, and the angle between the guiding groove and the axis of the operating member is larger than 0 degree and smaller than 90 degrees.

10. The latching mechanism as claimed in claim 8, wherein the resilient member and the latching member are received in the cavity of the shaft, and the shaft is partially received in the through hole of the operating member.

11. The latching mechanism as claimed in claim 1, wherein the main body further includes a flange formed on the shaft, and the operating member is mounted to the flange.

12. The latching mechanism as claimed in claim 11, wherein the flange defines a mounting cutout therein, a hook is formed on one end of the operating member, and the hook is rotatably mounted in the mounting cutout about an axis thereby allowing the operating member to rotate relative to the shaft.

13. The latching mechanism as claimed in claim 1, further comprising a sleeve, wherein the sleeve is mounted to the operating member and is rotatable with the operating member.

14. A portable electronic device comprising:

a housing;

an accessory member; and a latching mechanism configured for detachably mounting the accessory member to the housing, the latching mechanism comprising:

a main body having a shaft;

a latching member mounted to the shaft and being slidable relative to the shaft along an extending direction of the shaft;

a resilient member, one end of the resilient member abutting the main body and an opposite end of the resilient member abutting the latching member; and an operating member being mounted to the shaft;

a pin connecting the operating member, the shaft and the latching member together, the operating member being rotatable relative to the shaft to allow the pin to drive the latching member to slide relative to the shaft.

15. The portable electronic device as claimed in claim 14, wherein the shaft defines a sliding groove therein, the latching member defines a pin hole therein, the operating member defines a guiding groove therein, and the pin is configured for being receivable in the sliding groove, the pin hole, and the guiding groove.

16. The portable electronic device as claimed in claim 15, wherein the sliding groove and the guiding groove cooperate to form an angle therebetween.

17. The portable electronic device as claimed in claim 16, wherein the angle between the sliding groove and the guiding groove is larger than 0 degree and smaller than 90 degrees.

18. The portable electronic device as claimed in claim 14, wherein the housing defines a receiving groove in one end thereof and has a mounting portion, and the latching mechanism is mounted to the mounting portion thereby mounting the accessory member in the receiving groove.

* * * * *